(12) United States Patent
Dianda

(10) Patent No.: US 8,548,151 B1
(45) Date of Patent: Oct. 1, 2013

(54) METHOD FOR MIGRATING FROM AN OLD COMMUNICATION SWITCH TO A NEW COMMUNICATION SWITCH

(75) Inventor: Robert B. Dianda, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2299 days.

(21) Appl. No.: 11/403,312

(22) Filed: Apr. 13, 2006

(51) Int. Cl.
*H04M 7/00* (2006.01)

(52) U.S. Cl.
USPC ..................................... 379/219; 379/221.01

(58) Field of Classification Search
USPC ............... 379/219, 207, 211.01, 212.01, 220, 379/221.1, 229
See application file for complete search history.

(56) References Cited

U.S. PATENT DOCUMENTS

| | | | | |
|---|---|---|---|---|
| 4,754,479 A * | 6/1988 | Bicknell et al. | ......... | 379/221.13 |
| 5,048,081 A * | 9/1991 | Gavaras et al. | ............... | 379/230 |
| 5,187,732 A * | 2/1993 | Suzuki | ....................... | 379/22.02 |
| 5,926,482 A | 7/1999 | Christie et al. | | |
| 5,995,609 A * | 11/1999 | Melnyk et al. | ........... | 379/221.13 |
| 6,295,615 B1 * | 9/2001 | Cohen | .......................... | 714/712 |
| 6,381,327 B1 * | 4/2002 | Loebig | ..................... | 379/221.03 |
| 6,400,713 B1 * | 6/2002 | Thomas et al. | ............... | 370/355 |
| 6,567,667 B1 * | 5/2003 | Gupta et al. | .................. | 455/445 |
| 6,628,617 B1 * | 9/2003 | Karol et al. | ....................... | 370/237 |
| 6,792,100 B2 * | 9/2004 | Nekrasovskaia et al. | ..... | 379/230 |
| 6,850,763 B1 * | 2/2005 | Naqvi et al. | .................... | 455/448 |
| 6,981,263 B1 * | 12/2005 | Zhang et al. | .................. | 719/310 |
| 7,013,004 B1 * | 3/2006 | Edwards | ....................... | 379/219 |
| 7,023,794 B2 * | 4/2006 | Khan et al. | ..................... | 370/219 |
| 7,215,643 B2 * | 5/2007 | Mussman et al. | ............. | 370/237 |
| 7,236,582 B2 * | 6/2007 | Yeh et al. | ..................... | 379/221.1 |
| 7,453,803 B1 * | 11/2008 | Bugenhagen | .................. | 370/230 |
| 7,570,692 B2 * | 8/2009 | Ahn et al. | ................ | 375/240.28 |
| 7,853,004 B2 * | 12/2010 | Horner | ........................... | 379/230 |
| 7,899,040 B2 * | 3/2011 | Andreasen | ..................... | 370/356 |
| 7,944,817 B1 * | 5/2011 | Sylvain | ......................... | 370/228 |
| 2002/0027983 A1 * | 3/2002 | Suzuki | ........................... | 379/229 |
| 2002/0080947 A1 * | 6/2002 | Mikhailov et al. | ........ | 379/221.13 |
| 2003/0099227 A1 * | 5/2003 | Yoo | .................................. | 370/352 |
| 2003/0169867 A1 * | 9/2003 | Nekrasovskaia et al. | ..... | 379/229 |
| 2004/0081116 A1 * | 4/2004 | Clay | ............................... | 370/321 |
| 2005/0074016 A1 * | 4/2005 | Dekeyser | ....................... | 370/401 |
| 2005/0190721 A1 * | 9/2005 | Pershan | ......................... | 370/328 |
| 2006/0039397 A1 * | 2/2006 | Hari et al. | ....................... | 370/431 |
| 2006/0072732 A1 * | 4/2006 | Varble et al. | ............. | 379/211.01 |
| 2006/0109972 A1 * | 5/2006 | Yeh et al. | ..................... | 379/221.1 |
| 2007/0127436 A1 * | 6/2007 | Karimi-Cherkandi et al. | .............................. | 370/352 |
| 2007/0220082 A1 * | 9/2007 | Andreasen | ..................... | 709/203 |
| 2008/0002669 A1 * | 1/2008 | O'Brien et al. | ................ | 370/352 |
| 2008/0117898 A1 * | 5/2008 | Davidson et al. | ............. | 370/389 |
| 2008/0159273 A1 * | 7/2008 | Brugman | ....................... | 370/356 |
| 2009/0268608 A1 * | 10/2009 | Lobig et al. | .................... | 370/220 |
| 2010/0157987 A1 * | 6/2010 | Taylor | ............................ | 370/352 |

\* cited by examiner

*Primary Examiner* — William Deane, Jr.

(57) ABSTRACT

A method for migrating from an old communication switch to a new communication switch is provided according to the invention. The old communication switch interfaces between a packet telephony network and a circuit switched telephony network. The method includes configuring the old communication switch to signal the new communication switch and swinging one or more logical links from the old communication switch to the new communication switch until all logical links between the circuit switched telephony network and the old communication switch have been swung.

14 Claims, 7 Drawing Sheets

METHOD FOR MIGRATING FROM AN OLD COMMUNICATION SWITCH TO A NEW COMMUNICATION SWITCH

BACKGROUND OF THE INVENTION

1. Field of the Invention

The invention is related to the field of switch migration, and in particular, to a method for migrating from an old communication switch to a new communication switch.

2. Statement of the Problem

Many types of communication networks exist. One type of communication network is a cable television network, wherein homes and businesses are connected to a cable provider by coaxial cables. With the advent of cable modem devices, cable networks have become increasingly popular for Internet access.

Another communication type that has surged in popularity is telephone service over the Internet, popularly referred to as Voice Over Packet (VOP) or Voice Over Internet Protocol (VOIP). Through digitization and packetization of voice, a telephone call can be conducted over a digital network such as a network employing the Internet Protocol (IP), for example. Therefore, a cable network can be interfaced to a telephone network so that VOP telephone calls can be exchanged between networks.

In the prior art, an interface system relays communications between a circuit switched telephony network and a packet telephony network. The packet telephony network can comprise any manner of digital communication network that interfaces to the circuit switched telephony network. For example, the packet telephony network can comprise a cable television network or computer network of some manner.

The prior art interface system can include a switch, a Border Controller (BC) between the packet telephony network and the switch, and a telephone network interface between the switch and the circuit switched telephony network. In operation, when the packet telephony network generates a communication targeted to the circuit switched telephony network, the packet telephony network signals the BC, which routes the communication to the switch. The switch then further routes the communication to the telephone network through an associated trunk line(s).

On occasion, the routing of communications between the two networks must necessarily be modified. When the switch is to be replaced, then the telephone calls between the two networks (or other communications) must be re-routed in order to ensure that the calls are delivered.

It is imperative that the migration between switches be fast in order to avoid or minimize a drop in service availability. The migration must be planned out in advance so that the old communication switch configuration can be quickly and easily re-instituted if a problem occurs during the migration. If the migration is not conducted properly and efficiently, the result can be a loss of service. If the migration is not conducted properly and efficiently, the result can be an unacceptably long loss of service. If the migration is not conducted properly and efficiently, the result can be a difficult, costly, and time-consuming change back to the original configuration and necessity to re-conduct the migration at a later time.

SUMMARY OF THE SOLUTION

A method for migrating from an old communication switch to a new communication switch is provided according to some examples of the invention. The old communication switch interfaces between a packet telephony network and a circuit switched telephony network. The method comprises configuring the old communication switch to signal the new communication switch and swinging one or more logical links from the old communication switch to the new communication switch until all logical links between the circuit switched telephony network and the old communication switch have been swung.

A method for migrating from an old communication switch to a new communication switch is provided according to some examples of the invention. The method comprises, in the old communication switch, interfacing between a packet telephony network and a circuit switched telephony network. The method further comprises in the old communication switch, signaling the new communication switch to perform as an alternate interface path between the packet telephony network and the circuit switch telephony network. The method further comprises in the circuit switched telephony network moving one or more logical links from the old communication switch to the new communication switch until all logical links between the circuit switched telephone network and the old communication switch have been moved.

A method for migrating from an old communication switch to a new communication switch is provided according to some examples of the invention. The old communication switch interfaces between a packet telephony network and a circuit switched telephony network. The method comprises configuring the old communication switch to signal the new communication switch, programming one or more Circuit ID Codes (CICs) in a Digital Access and Cross-connect System (DACS) to change one or more corresponding logical link endpoints from the old communication switch to the new communication switch, and programming one or more corresponding point codes in a Signal Transfer Point (STP) of the circuit switched telephony network to route signaling to the new communication switch. The method further comprises receiving a call from the packet telephony network into the old communication switch, the old communication switch transporting the call to the circuit switched telephony network if the old communication switch has available capacity to the circuit switched telephony network, and the old communication switch signaling the new communication switch if the old communication switch does not have available capacity to the circuit switched telephony network.

DESCRIPTION OF THE DRAWINGS

The same reference number represents the same element on all drawings.

DETAILED DESCRIPTION OF THE INVENTION

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
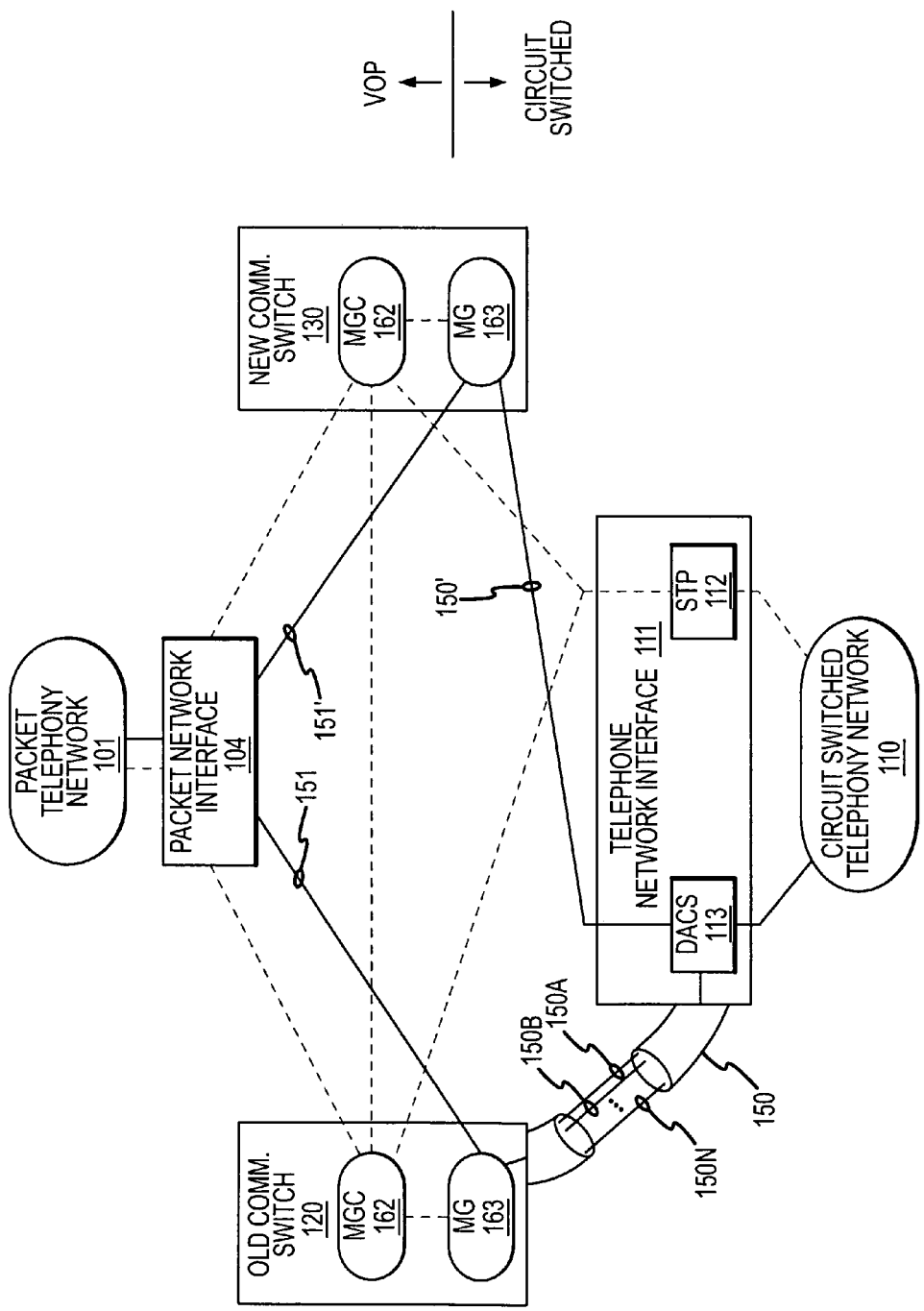
FIG. 1 shows a network interface environment according to an embodiment of the invention.

FIG. 1 shows a network interface environment 100 according to an embodiment of the invention. The network interface environment 100 interfaces between a packet telephony network 101 and a circuit switched telephony network 110. The network interface environment 100 includes at least an old communication switch 120 and a new communication switch 130. The network interface environment 100 can further include a packet network interface 104 and a telephone network interface 111. The old communication switch 120 is configured to exchange communications between the packet telephony network 101 and the circuit switched telephony network 110. In this figure, the new communication switch 130 is connected into the network interface environment 100, but has yet to be configured to replace the old communication switch 120. In order to migrate the two networks 101 and 110 to the new communication switch 130, logical links are swung from the old communication switch 120 to the new communication switch 130. When configured according to the invention, the new communication switch 130 will exchange communications between the packet telephony network 101 and the circuit switched telephony network 110.

The packet telephony network 101 is connected to the packet network interface 104. The packet network interface 104 in one embodiment comprises a Border Controller (BC or Session Border Controller (SBC)) 104. The packet network interface 104 exchanges communication packets between the packet telephony network 101 and the old communication switch 120. An example of a packet telephony network is a computer network. Another example of a packet telephony network is a cable television (CATV) network that offers broadband data access.

The circuit switched telephony network 110 is connected to the telephone network interface 111. The telephone network interface 111 exchanges voice call information between the circuit switched telephony network 110 and the old communication switch 120. The telephone network interface 111 in one embodiment comprises a Digital Access and Cross-connect System (DACS) 113 and a Signal Transfer Point (STP) 112. The DACS 113 performs selecting/switching operations for communication links, such as the logical link 150, for example. In one embodiment, the DACS 113 configures the logical link 150 at the direction of a human operator. The STP 112 routes call signaling, such as SS7 telephony signaling, for example.

The old communication switch 120 is connected to the packet network interface 104 by an Internet Protocol (IP) link 151. The old communication switch 120 is connected to the telephone network interface 111 by a trunk line 150. The trunk line 150 can comprise a plurality of logical links 150A-150N.

The new communication switch 130 is connected to the packet network interface 104 by a new packet link 151'. The new communication switch 130 is connected to the telephone network interface 111 by a new trunk line 150'. The new trunk line 150' can also comprise a plurality of logical links 150A'-150M' (not shown). The new trunk line 150' and the new packet link 151' must be installed before the migration can commence.

A logical link 150$x$ can comprise any manner of communication link. In one embodiment, a logical link 150$x$ comprises a time slot on a Time-Division Multiplexed (TDM) trunk line. A TDM voice call is transported over an allocated TDM trunk line time slot comprising the particular logical link 150$x$. If the trunk line 150 comprises a T1 trunk line, for example, then multiple logical links 150A-150N can exist between the two components, as mentioned above. The logical link 150 could comprise a TDM time slot on a DS-1 or DS-3 link, for example. A DS-1 link provides up to 24 logical (i.e., DS-0) link time slots on a T1 wire, fiber, or cable. A DS-3 link provides 28 T1 channels.

For a telephone call from the circuit switched telephone network 110 to the packet telephony network 101, the signaling information processed by the telephone network interface 111 can include link information that specifies a logical link 150$x$ on the trunk line 150. For example, the signaling information can specify a particular TDM time slot (e.g., a logical link) of the trunk line 150. A particular logical link 150$x$ is typically specified in a Circuit ID Code (CIC). A logical link therefore identifies a DS-0 time slot in a TDM network.

In SS7 signaling, a point code identifies a particular network node and therefore can be used to route signaling messages. The STP 112 uses point codes to route call signaling to other signaling nodes. When a configuration change is made in the DACS 113, a corresponding point code mapping can be changed in the STP 112 in order to conform the call signaling to the network configuration change. Consequently, the STP 112 can perform point code mapping in order to conform a signal path to a new (TDM) logical link 150' that has been swung from the old communication switch 120 to the new communication switch 130. Point code mapping allows the mapping of one combination of point code and Circuit ID Code (CIC) to another point code and CIC. All SS7 signaling messages include the CIC parameter. Therefore, one or more CICs are programmed to new values in the DACS 113 when a logical link on the old communication switch 120 with CIC=150$x$ is moved to the new communication switch 130. For example, the DACS 113 can be programmed to a new value of CIC=150$y$. Consequently, when the STP 112 receives signaling messages for the CIC=150$x$ and the point code of the old communication switch 120, then the STP 112 will replace the switch code of the old communication switch 120 with that of the new communication switch 130 and will also replace CIC=150$x$ with CIC=150$y$ and accordingly will send the message to the new communication switch 130.

Because multiple logical links can be present in the trunk line 150 extending between the old communication switch 120 and the telephone network interface 111, multiple point codes and multiple trunk line logical links 150 may need to be swung to the new communication switch 130 (i.e., two point codes per logical link 150$x$). However, the old communication switch 120 can select a next available logical link 150$y$ for a particular call. Therefore, until all of the TDM logical links 150A-150N have been swung over to the new communication switch 130, the old communication switch 120 may simply seize the next available logical link 150$y$.

Once all of the logical links 150A-150N (or alternatively a large percentage of logical links) have been swung to the new communication switch 130, then the old communication switch 120 will determine that it cannot transport the call. At this point, the old communication switch 120 signals the new communication switch 130 and the call signaling flows to the new communication switch 130. At this point, the telephone call originating from the packet telephony network 101 will be routed through the new communication switch 130 and over a new logical link 150*x'*.

The new communication switch 130 can be added to the network interface environment 100 for various reasons, such as for upgrading switching capacity, for repairs or maintenance, etc. When migrating from the old communication switch 120 to the new communication switch 130, it is desirable to perform the migration in a straightforward and trouble-free manner. The migration from the old communication switch 120 to the new communication switch 130 should be performed with a minimum of down time. The migration from the old communication switch 120 to the new communication switch 130 should be performed in an easily reversible manner, in case problems are encountered in the migration. The migration from the old communication switch 120 to the new communication switch 130 should be performed in an orderly fashion in order to minimize communication disturbances and minimize migration effort and expense. The migration method is shown in FIGS. 2-6 and is described in the accompanying text, below.

In one embodiment, the packet telephony network 101 comprises a Session Initiation Protocol (SIP) network, including a network that can perform Voice Over Packet (VOP) telephone calls. The old communication switch 120 and the new communication switch 130 communicate with both the packet telephony network 101 and the circuit switched telephony network 110 and therefore may have both a VOP network side and a circuit switched side, as shown in the figure.

The old communication switch 120 and the new communication switch 130 can comprise a Media Gateway (MG) 163 and a Media Gateway Controller (MGC) 162. The MGC 162 performs call processing and is often termed a "soft switch." The MG 163 performs the call transport. In addition, the MG 163 can convert voice call time-slot data into packet data and vice versa.

In a first step of the migration process, the new communication switch 130 is configured to be able to signal the old communication switch 120, and vice versa. In addition, the old communication switch 120 is configured to be able to signal the new communication switch 130 as an alternate switch, such as when the old communication switch 120 does not have additional call transport capacity to the circuit switched telephony network 110. However, the logical links 150A-150N still exchange all communications between the circuit switched telephony network 110 and the old communication switch 120. As a consequence, the new communication switch 130 does not yet transport calls between the two networks.

Figure 2:
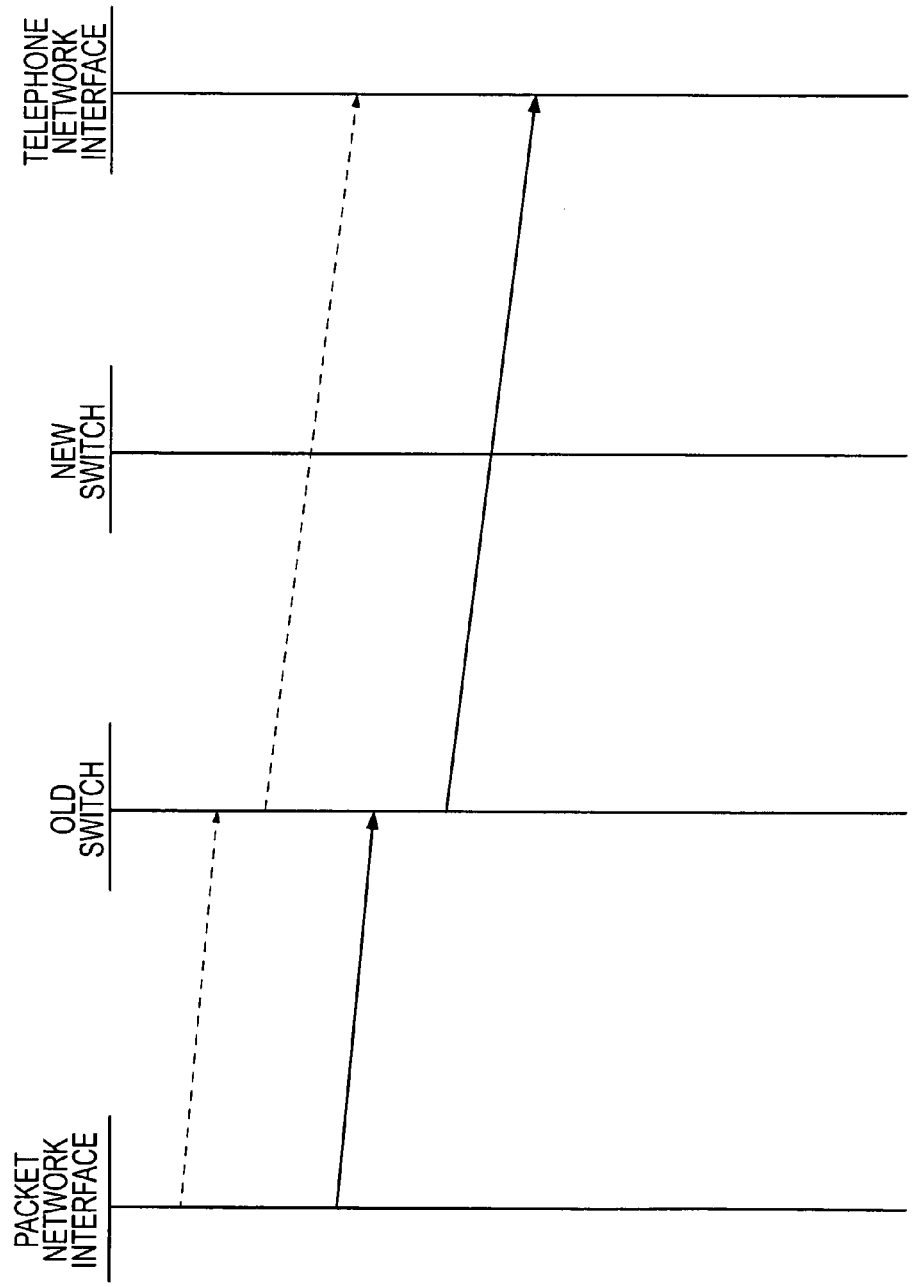
FIG. 2 is a message flow diagram for a telephone call after a first migration step, wherein the telephone call originates in a packet telephony network and is destined for a circuit switched telephony network.

FIG. 2 is a message flow diagram for a telephone call after the first migration step, wherein the telephone call originates in the packet telephony network 101 and is destined for the circuit switched telephony network 110. The dashed arrows represent the call signaling that sets up the telephone call, while the solid arrows represent the actual voice transport. It should be noted that although the call signaling and voice transport arrows are denoted in the direction of call establishment, the call signaling and voice transport can comprise communications in both directions.

To initiate the telephone call, the packet telephony network 101 (not shown) signals the packet network interface 104, which in turn signals the old communication switch 120. In response, the old communication switch 120 seizes a logical link 150*x* and signals the telephone network interface 111, which in turn signals the circuit switched telephony network 110 (not shown). The signaling sets up the network interface environment 100 for the telephone call. As a consequence, packets are routed and transported from the packet telephony network 101 to the old communication switch 120. The old communication switch 120 converts the packets into voice information for TDM communication. The old communication switch 120 places the voice information onto the logical link 150, and the logical link 150 transports the voice information to the telephone network interface 111 and ultimately to the circuit switched telephony network 110.

Figure 3:
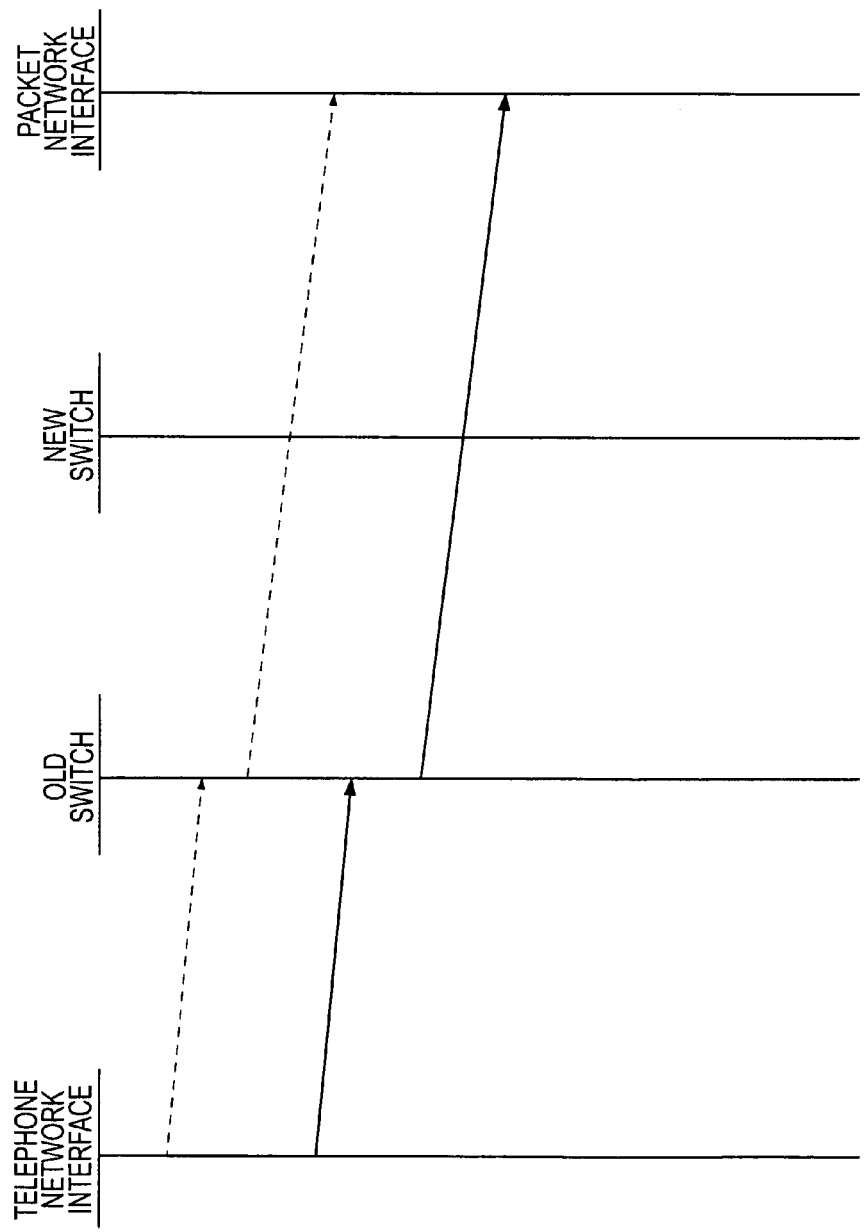
FIG. 3 is a message flow diagram for a telephone call that originates in the circuit switched telephony network and that is destined for the packet telephony network.

FIG. 3 is a message flow diagram for a telephone call that originates in the circuit switched telephony network 110 and that is destined for the packet telephony network 101. The telephone call again occurs after the first migration step. The dashed arrows represent the call signaling that sets up the telephone call, while the solid arrows represent the actual voice transport.

To initiate the call, the circuit switched telephony network 110 (not shown) signals the telephone network interface 111, which in turn signals the old communication switch 120. The old communication switch 120 signals the packet network interface 104, which in turn signals the packet telephony network 101 (not shown). The signaling sets up the network interface environment 100 for the telephone call. As a consequence, TDM voice information is transported from the circuit switched telephony network 110 to the old communication switch 120 over the logical link 150. The old communication switch 120 receives the voice information and converts the voice information into packets. The old communication switch 120 routes the packets to the packet network interface 104 and ultimately to the packet telephony network 101.

In a second step of the migration process, the logical links 150 are swung from the old communication switch 120 to the new communication switch 130. Logical links 150 can be swung individually or can be swung in blocks. Subsequently, the telephone network interface 111 is configured to route corresponding call signaling to the new communication switch 130. Therefore, the call signaling for each swung logical link is routed to the new communication switch 130 by the telephone network interface 111. This includes programming the DACS 113 and programming the STP 112. A Circuit ID Code (CIC) is used in the signaling messages in order to identify a particular logical link 150*x* of the trunk line 150. Consequently, the DACS 113 can be programmed in order to swing one or more corresponding logical links over to the new communication switch 130. The provisioning of the STP 112 comprises programming a mapping for each logical link that is moved from the old communication switch 120 to the new communication switch 130. The programming and mapping must occur at approximately the same time. When a logical link on the old communication switch 120 with CIC=150*x* is moved to the new communication switch 130 and is mapped to the CIC=150*y*, then when the STP 112 receives signaling messages for CIDC=150*x* and the point code of switch 120, the STP 112 will replace the switch code of the old communication switch 120 with that of the new communication switch 130 and will replace the original CIC=150*x* with the new CIC=150*y* and will accordingly send the message to the new communication switch 130. The point code programming modifies the signal routing performed by the STP 112. As a result, for logical links that have been swung, the STP 112 will subsequently route call signaling from the circuit switched telephony network 110 to the new communication switch 130. After the swinging and the signaling change, the swung logical links 150 exchange communications between the circuit switched telephony network 110 and the new communication switch 130. After all logical links have been swung, the packet network interface 104 can be programmed to exclusively signal the new communication switch 130 and not signal the old communication switch 120.

Figure 4:
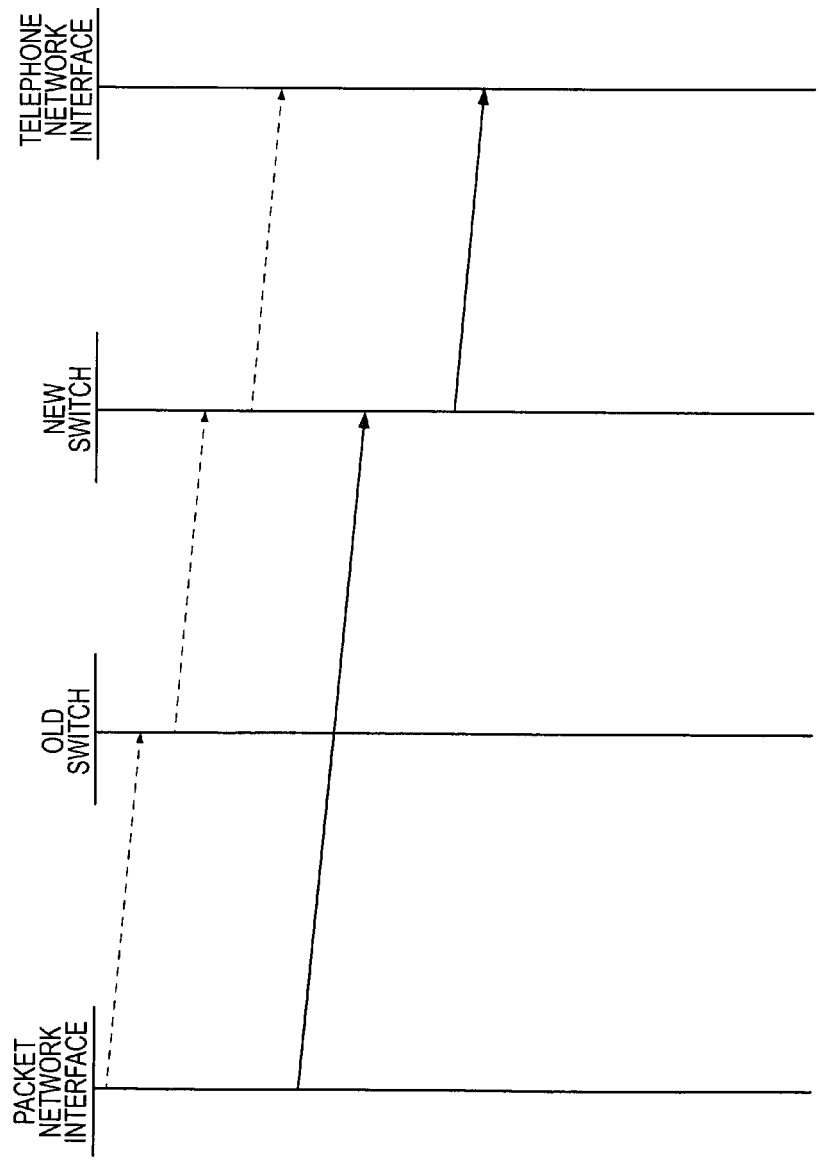
FIG. 4 is a message flow diagram for a telephone call that originates in the packet telephony network after the second step of the migration process.

FIG. 4 is a message flow diagram for a telephone call that originates in the packet telephony network 101 (not shown) after the second step of the migration process. As before, the call signaling is denoted by the dashed arrows and the voice transport is denoted by solid arrows. The packet telephony network 101 signals the packet network interface 104 and the packet network interface 104 signals the old communication switch 120. However, because all available logical links 150A-150N have been swung to the new communication switch 130 (i.e., converted to new logical links 150'), the old communication switch 120 cannot provide the voice transport for the telephone call. Therefore, the old communication switch 120 signals the new communication switch 130 and the new communication switch 130 signals the telephone network interface 111. The telephone call is subsequently transported through the new communication switch 130, using a new trunk line 150' that has been swung from the old communication switch 120.

Figure 5:
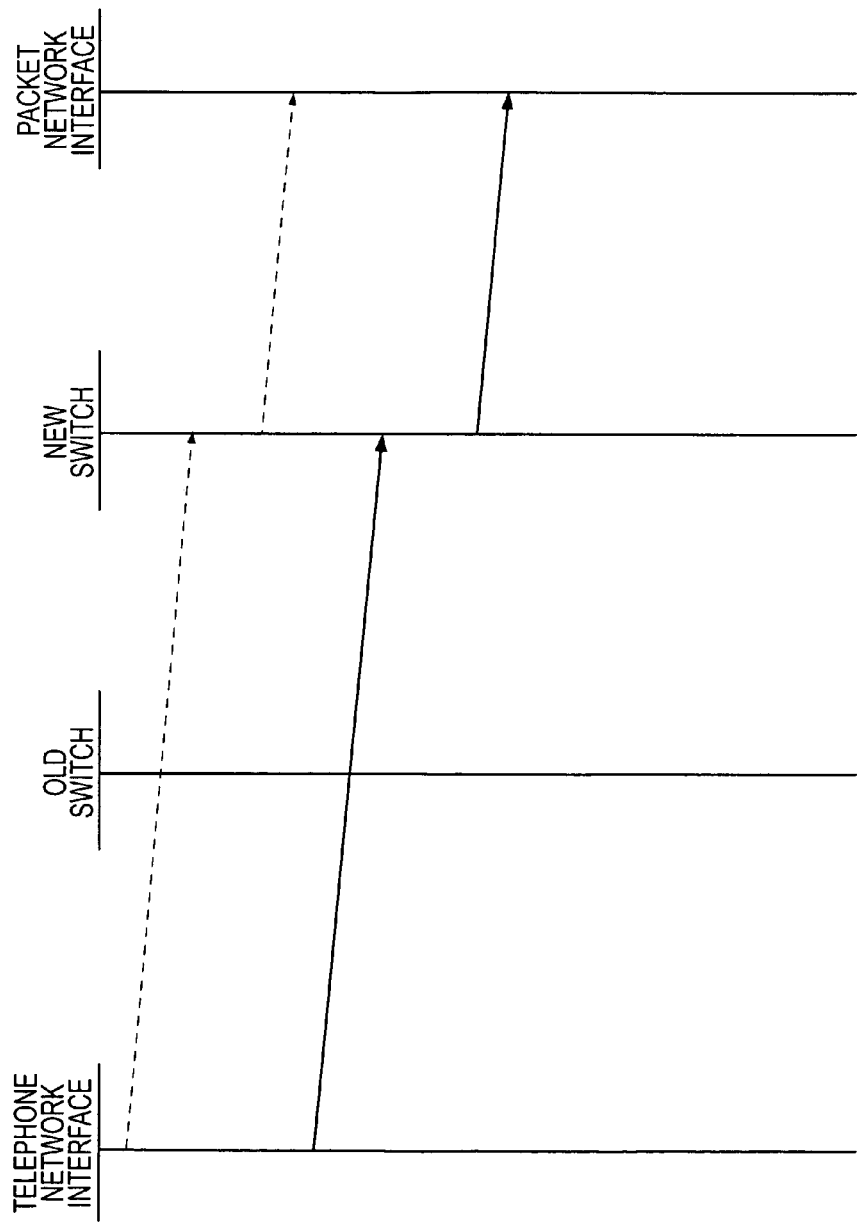
FIG. 5 is a message flow diagram for a telephone call that originates in the circuit switched telephony network after the second step of the migration process.

FIG. 5 is a message flow diagram for a telephone call that originates in the circuit switched telephony network 110 after the second step of the migration process. As before, the call signaling is denoted by the dashed arrows and the voice transport is denoted by solid arrows. The telephone call originates in the circuit switched telephony network 110 (not shown), which signals the telephone network interface 111. The telephone network interface 111 performs point code mapping and subsequently signals the new communication switch 130. The new communication switch 130 signals the packet network interface 104. Here, the voice transport is set up to go through the new communication switch 130 and not through the old communication switch 120. After the signaling has been completed, the telephone call is transported through the new communication switch 130, using a new trunk line 150'.

It should be understood that the migration method herein described can be repeatedly performed in order to move multiple trunk lines from the old communication switch 120 to the new communication switch 130. In this manner, the old communication switch 120 can be de-populated. When fully de-populated, the old communication switch 120 can be physically removed from the network interface environment 100.

Figure 6:
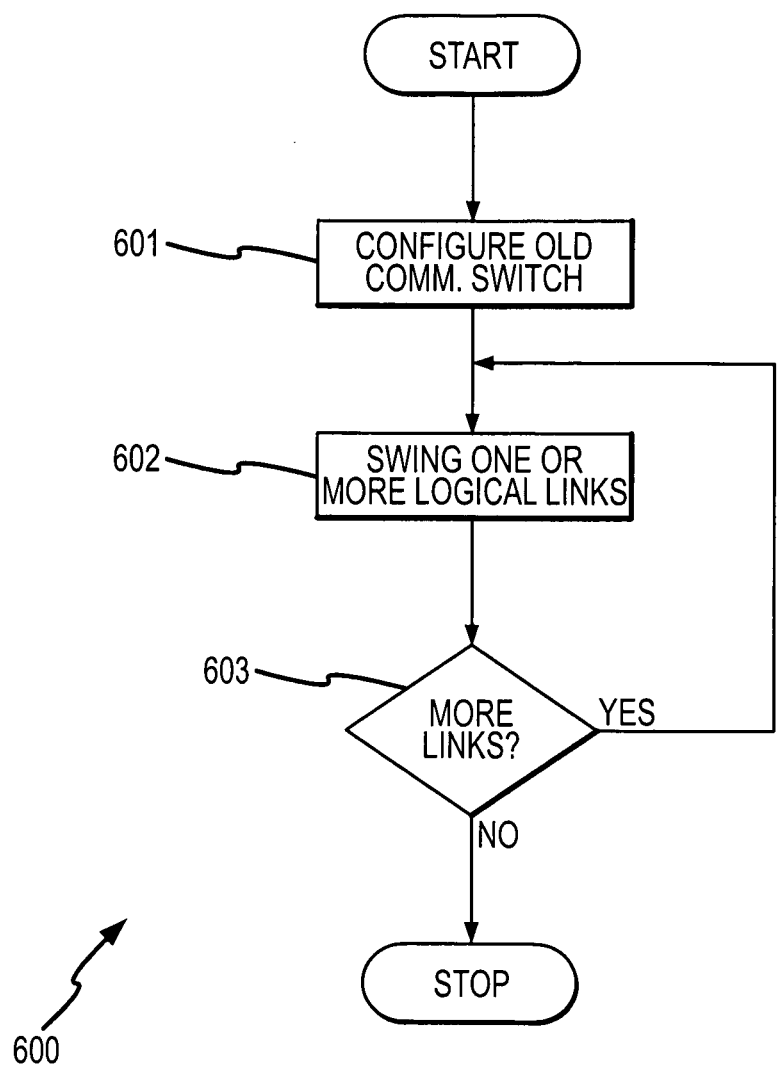
FIG. 6 is a flowchart of a method for migrating from an old communication switch to a new communication switch according to an embodiment of the invention.

FIG. 6 is a flowchart 600 of a method for migrating from an old communication switch 120 to a new communication switch 130 according to an embodiment of the invention. In step 601, the old communication switch 120 is configured to be able to signal the new communication switch 130. The configuring includes configuring old communication switch 120 to signal the new communication switch 130 as an alternate if the old communication switch 120 cannot transport the telephone call.

In step 602, one or more logical links are swung from the old communication switch 120 to the new communication switch 130, as previously discussed. The one or more logical links now exchange communications between the telephone network interface 111 and the new communication switch 130. As a consequence, calls outbound from the circuit switched telephony network 110 are transported through the new communication switch 130.

In one embodiment, the swinging comprises programming the DACS 113 with CICs that swing the one or more logical links from the old communication switch 120 to the new communication switch 130. In addition, the swinging further comprises programming one or more corresponding point codes in the STP 112 so that call signaling for the one or more logical links is transmitted to the new communication switch 130.

In step 603, if more logical links still exist between the telephone network interface 111 and the old communication switch 120, the method branches back to step 602. In this manner, logical links between the old communication switch 120 and the telephone network interface 111 can be iteratively swung to the new communication switch 130. Otherwise, the method exits.

Optionally, at a later time, the circuit switched telephony network 110 can be configured so that outbound telephone calls from the circuit switched telephony network 110 include a point code of the new communication switch 130, and not the old communication switch 120. As a result, the telephone network interface 111 will not be required to re-map point codes in outbound telephone calls to the new communication switch 130. In addition, at a later time, the packet telephony network 101 can be configured so that outbound telephone calls from the packet telephony network 101 are directly routed to the new communication switch 130, and the old communication switch 120 is not signaled.

Figure 7:
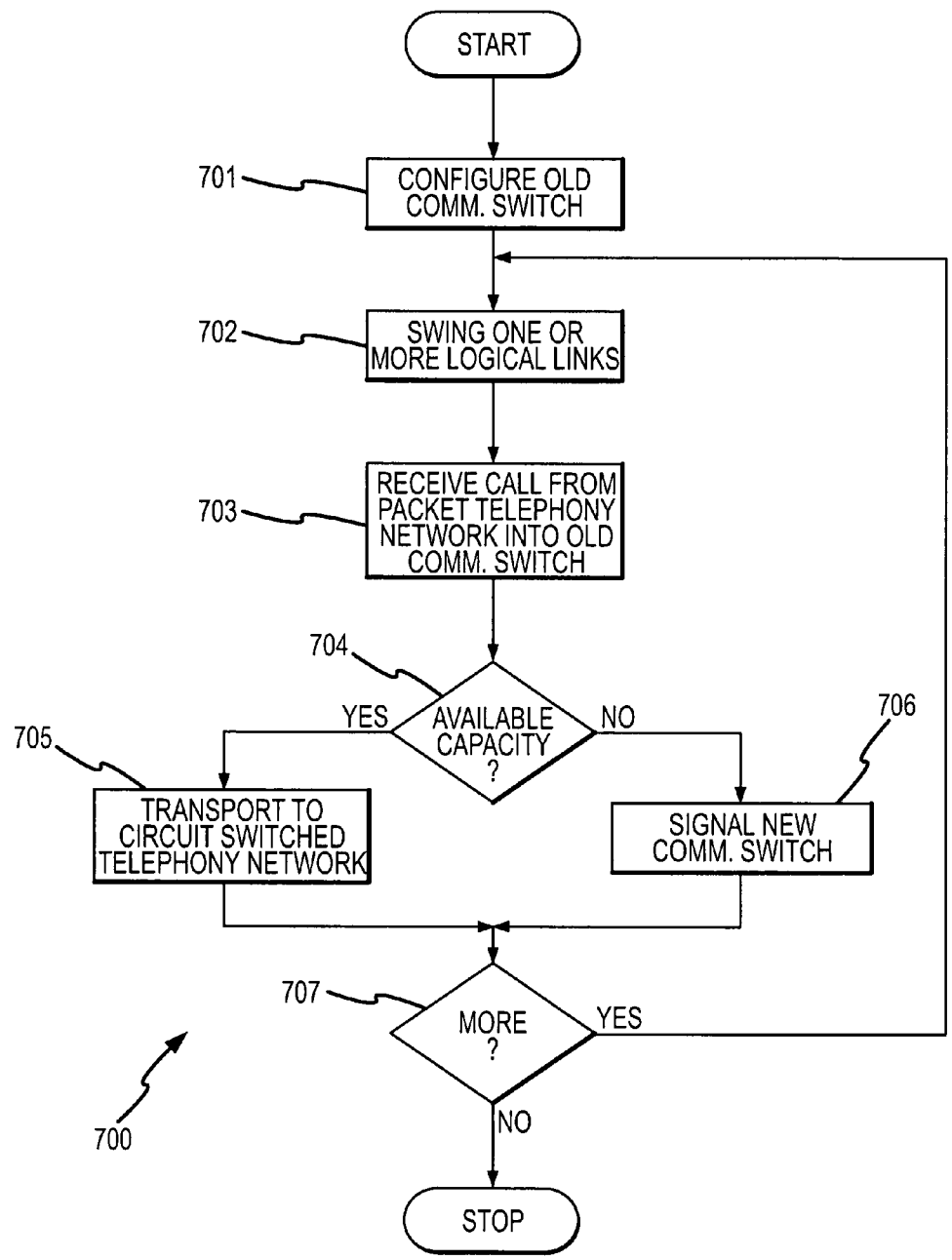
FIG. 7 is a flowchart of a method for migrating from an old communication switch to a new communication switch according to an embodiment of the invention.

FIG. 7 is a flowchart 700 of a method for migrating from an old communication switch 120 to a new communication switch 130 according to an embodiment of the invention. In step 701, the old communication switch 120 is configured to be able to signal the new communication switch 130, as previously discussed.

In step 702, one or more logical links are swung from the old communication switch 120 to the new communication switch 130, as previously discussed.

In step 703, signaling of a telephone call outbound from the packet telephony network 101 is received in the old communication switch 120. The old communication switch 120 will attempt to route the telephone call directly to the telephone network interface 111 over the trunk line 150. As a result, the old communication switch 120 will attempt to seize a logical link 150x of the trunk line 150.

In step 704, if there is available capacity on the trunk line 150, then the method will branch to step 705. Otherwise, if sufficient capacity is not available on the trunk line 150, then the method will branch to step 706. Available capacity in one embodiment exists if there is at least one logical link 150x available on the trunk line 150. Alternatively, in another embodiment, available capacity can be judged to not exist if less than a predetermined percentage of trunk line capacity is available.

In step 705, available capacity exists on the trunk line 150. Consequently, the old communication switch 120 seizes a logical link and transports voice information to the circuit switched telephony network 110 over the trunk line 150.

In step 706, sufficient capacity is not available on the trunk line 150 and the old communication switch 120 signals the new communication switch 130. The new communication switch 130 subsequently signals the telephone network interface 111 and transports the voice information to the circuit switched telephony network 110 over a logical link that has been swung to the new trunk line 150'.

In step 707, if more logical links still exist between the telephone network interface 111 and the old communication switch 120, the method branches back to step 702. In this manner, logical links between the old communication switch 120 and the telephone network interface 111 can be iteratively swung to the new communication switch 130, as previously discussed. Otherwise, the method exits.

Optionally, at a later time, the circuit switched telephony network 110 and the packet telephony network 101 can be configured to eliminate the old communication switch 120, as previously discussed. As a result, telephone calls are directly routed through the new communication switch 130 and the old communication switch 120 is not signaled.

The invention claimed is:

1. A method of operating a communication system comprising:
   in an old communication switch, interfacing between a packet telephony network and a circuit switched telephony network over a plurality of logical links;
   in the old communication switch, signaling a new communication switch to perform as an alternate interface path between the packet telephony network and the circuit switched telephony network; and
   in the circuit switched telephony network, moving one or more of the logical links from the old communication switch to the new communication switch until all logical links between the circuit switched telephony network and the old communication switch have been moved.

2. The method of claim 1, further comprising in the circuit switched telephony network, signaling the new communication switch to interface with the circuit switched telephony network after the moving.

3. The method of claim 1, further comprising, in the packet telephony network, signaling the new communication switch to interface with the packet telephony network after the moving.

4. The method of claim 1, with moving the one or more logical links comprising:
   in a Digital Access and Cross-connect System (DACS), changing one or more corresponding logical link endpoints from the old communication switch to the new communication switch; and
   in a Signal Transfer Point (STP), mapping corresponding Circuit ID Codes (CICs) and signaling point codes of the circuit switched telephony network to route signaling to the new communication switch.

5. The method of claim 1, with the new communication switch comprising a Media Gateway Controller (MGC) and a Media Gateway (MG).

6. A method for operating a communication system comprising:
   in an old communication switch, interfacing between a packet telephony network and a circuit switched telephony network over a plurality of logical links;
   in the old communication switch, signaling a new communication switch to perform as an alternate interface path between the packet telephony network and the circuit switched telephony network;
   in the circuit switched telephony network, moving one or more of the logical links from the old communication switch to the new communication switch;
   in the old communication switch, receiving a call from the packet telephony network;
   in the old communication switch, transporting the call to the circuit switched telephony network if the old communication switch has available capacity to the circuit switched telephony network; and
   in the old communication switch, signaling the new communication switch to transport the call to the circuit switched telephony network if the old communication switch does not have available capacity to the circuit switched telephony network.

7. The method of claim 6, further comprising in the circuit switched telephony network, signaling the new communication switch to interface with the circuit switched telephony network after the moving.

8. The method of claim 6, further comprising, in the packet telephony network, signaling the new communication switch to interface with the packet telephony network after the moving.

9. The method of claim 6, with moving the one or more logical links comprising:
   in a Digital Access and Cross-connect System (DACS), changing one or more corresponding logical link endpoints from the old communication switch to the new communication switch; and
   in a Signal Transfer Point (STP), mapping corresponding Circuit ID Codes (CICs) and signaling point codes of the circuit switched telephony network to route signaling to the new communication switch.

10. The method of claim 6, with the new communication switch comprising a Media Gateway Controller (MGC) and a Media Gateway (MG).

11. A method for operating a communication system comprising:
   in an old communication switch, interfacing between a packet telephony network and a circuit switched telephony network over a plurality of logical links;
   in the old communication switch, signaling a new communication switch to perform as an alternate interface path between the packet telephony network and the circuit switched telephony network;
   in a Digital Access and Cross-connect System (DACS), changing one or more of the corresponding logical link endpoints from the old communication switch to the new communication switch; and
   in a Signal Transfer Point (STP), mapping corresponding Circuit ID Codes (CICs) and signaling point codes of the circuit switched telephony network to route signaling to the new communication switch;
   in the old communication switch, receiving a call from the packet telephony network;
   in the old communication switch, transporting the call to the circuit switched telephony network if the old communication switch has available capacity to the circuit switched telephony network; and
   in the old communication switch, signaling the new communication switch to transport the call to the circuit switched telephony network if the old communication switch does not have available capacity to the circuit switched telephony network.

12. The method of claim 11, further comprising in the circuit switched telephony network, signaling the new communication switch to interface with the circuit switched telephony network after the mapping and changing steps.

13. The method of claim 11, further comprising in the packet telephony network, signaling the new communication switch to interface with the packet telephony network after the mapping and changing steps.

14. The method of claim 11, with the new communication switch comprising a Media Gateway Controller (MGC) and a Media Gateway (MG).

* * * * *